United States Patent
Ishimori et al.

[11] Patent Number: 6,038,840
[45] Date of Patent: Mar. 21, 2000

[54] REAR DISCHARGE MOWER UNIT AND LAWN TRACTOR

[75] Inventors: Shozo Ishimori; Masatoshi Yamaguchi, both of Sakai, Japan; Cristophe Auvergne; Bertrand Leguillette, both of Argenteuil Cedex, France

[73] Assignee: Kubota Corporation, Japan

[21] Appl. No.: 08/949,114

[22] Filed: Oct. 10, 1997

[30] Foreign Application Priority Data

Apr. 16, 1997 [JP] Japan ................................ 9-098926

[51] Int. Cl.[7] .................................................. A01D 34/12
[52] U.S. Cl. ........................................ 56/13.3; 56/320.2
[58] Field of Search .................................. 56/13.3, 13.4, 56/13.5, 13.6, 13.7, 13.8, 320.2, DIG. 22, 202, 320.1

[56] References Cited

U.S. PATENT DOCUMENTS

| | | | |
|---|---|---|---|
| 3,469,376 | 9/1969 | Bacon | 56/6 |
| 3,969,876 | 7/1976 | Turos | 56/320.2 X |
| 4,345,416 | 8/1982 | Cameron | 56/13.3 |
| 4,364,221 | 12/1982 | Wixom | 56/13.6 |
| 4,835,951 | 6/1989 | Walker | 56/16.6 |
| 4,856,265 | 8/1989 | Wolf | 56/320.2 |
| 4,916,887 | 4/1990 | Mullet et al. | 56/13.8 |
| 4,958,484 | 9/1990 | Busboom | 56/255 |
| 5,035,108 | 7/1991 | Meyer | 56/13.4 |
| 5,214,906 | 6/1993 | Saki et al. | 56/320.2 |
| 5,267,429 | 12/1993 | Kettler et al. | 56/320.2 |
| 5,609,011 | 3/1997 | Kuhn et al. | 56/320.1 |

FOREIGN PATENT DOCUMENTS

| | | | |
|---|---|---|---|
| 59-203424 | 11/1984 | Japan | A01D 35/264 |
| 60-14341 | 5/1985 | Japan | A01D 34/64 |

*Primary Examiner*—H. Shackelford
*Attorney, Agent, or Firm*—Webb, Ziesenheim Logsdon Orkin & Hanson, P.C.

[57] ABSTRACT

A rear discharge mower unit (50) with a mower housing (55) defining grass clippings flow paths for directing grass clippings rearward. The mower unit includes a power transmission mechanism for rotating a center blade (58) and a second side blade (60) in one direction and a first side blade (59) in the other direction, a center baffle (63) extending around a rotational axis of the center blade and defining a center flow path (69a) for feeding grass clippings to a grass clippings outlet (66), a first side baffle (64) extending around a rotational axis of the first side blade (59) and defining a first side flow path (69b) for feeding grass clippings to the grass clippings outlet (66), and a second side baffle (65) extending around a rotational axis of the second side blade (60) and defining a second side flow path (69c) for feeding grass clippings to the center flow path (69a).

21 Claims, 7 Drawing Sheets

REAR DISCHARGE MOWER UNIT AND LAWN TRACTOR

BACKGROUND OF THE INVENTION

1. Field of the Invention

This invention relates to a rear discharge mower unit for rearwardly discharging grass clippings cut by blades. The invention relates also to a lawn tractor having such a rear discharge mower unit suspended between front and rear wheels, and a grass catcher disposed rearwardly of the rear wheels.

2. Description of the Related Art

A rear discharge mower unit has a plurality of blades arranged sideways and rotatably supported in a mower housing, and rearwardly discharges grass clippings cut by the blades as entrained by air flows produced by the rotating blades. U.S. Pat. No. 3,469,376, for example, discloses a rear discharge mower unit having four blades arranged symmetrically sideways. The two left blades are rotatable clockwise while the two right blades are rotatable counter-clockwise. Thus, all grass clippings are once collected in a middle region, and then thrown rearward through a space between the two middle blades.

U.S. Pat. No. 4,916,887 discloses a rear discharge mower unit having a side blade disposed at each opposite side of a center blade, and a mulching rotary blade disposed between the center blade and right side blade. The left side blade and center blade are both rotatable clockwise, whereby grass clippings cut by these two blades are fed confluently to a region to the left of the mulching rotary blade. Grass clippings cut by the right side blade are fed to a region to the right of the mulching rotary blade. The grass clippings are discharged rearwardly after being cut to pieces by the mulching rotary blade.

The former rear discharge mower unit has only a small space between the mower housing and each blade, and no special path provided for passage of grass clippings. Thus, the grass clippings cut by the blades cannot flow smoothly to the outlet, but tend to stagnate locally before discharge through the outlet. It is difficult to avoid the inconvenience of the grass clippings dropping from stagnating positions.

In the latter rear discharge mower unit, all the blades are rotatable in the same direction, which requires a relatively large distance between the path of grass clippings sent to the outlet by the center blade and the path of grass clippings sent to the outlet by the right side blade. This is obstructive to compactness of the mower housing.

SUMMARY OF THE INVENTION

A primary object of this invention is to solve the problems of the above conventional rear discharge mower units, and provide a rear discharge mower unit defining flow paths in a compact mower housing for permitting grass clippings to flow smoothly.

A secondary object of this invention is to provide a lawn tractor equipped with the above rear discharge mower unit of this invention, which includes no element projecting transversely of the tractor for transporting grass clippings from an outlet of the rear discharge mower unit to a grass catcher.

The primary object of this invention noted above is fulfilled by a rear discharge mower unit comprising a mower housing, a first side blade, a center blade and a second side blade arranged sideways in and rotatably supported by the mower housing, a power transmission mechanism for rotating the center blade and the second side blade in one direction and the first side blade in the other direction, a grass clippings outlet formed in a boundary region between the first side blade and the center blade, a center baffle extending around a rotational axis of the center blade and defining a center flow path for feeding grass clippings to the grass clippings outlet, a first side baffle extending around a rotational axis of the first side blade and defining a first side flow path for feeding grass clippings to the grass clippings outlet, and a second side baffle extending around a rotational axis of the second side blade and defining a second side flow path for feeding grass clippings to the center flow path.

In this construction, grass clippings cut by the second side blade flow through the second side flow path into the center flow path, and join grass clippings cut by the center blade. Further, the grass clippings are fed into the grass clippings outlet and join grass clippings cut by the first side blade and flowing in from the first side flow path. Thus, the grass clippings cut by the respective blades flow through the flow paths defined by the baffles to enter the grass clippings outlet reliably and smoothly. Then, the grass clippings may be discharged outside the mower unit or may be transmitted to a grass catcher through a duct. That is, the grass clippings may be discharged reliably to a predetermined position instead of being scattered in all directions.

In one preferred embodiment of this invention, the grass clippings outlet includes a discharge baffle connected to the center baffle and the first side baffle, the discharge baffle defining a discharge flow path for collecting and discharging grass clippings cut by the first side blade, the center blade and the second side blade. According to this construction, the center flow path and first side flow path are connected smoothly to the discharge flow path. Consequently, the grass clippings cut by the first side blade, center blade and second side blade flow into the discharge flow path without stagnating.

Where the discharge baffle includes a first baffle plate disposed adjacent the first side blade, and a second baffle plate disposed adjacent the center blade, the second baffle plate may extend obliquely to locate a discharge opening of the discharge flow path adjacent a middle position of the mower housing. Alternatively, the second baffle plate may extend linearly to locate the discharge opening of the discharge flow path away from the middle position of the mower housing. The location of the discharge opening may be selected according to the use of a lawn tractor on which the mower unit is mounted.

In a preferred embodiment of the invention, the second side flow path joins the center flow path in a region extending along a common tangent to circles of loci of the center blade and the second side blade, and the center flow path and the first side flow path join in a region extending along a common tangent to circles of loci of the center blade and the first side blade and communicating with the discharge flow path. In this construction, the grass clippings having flowed through the curved second side flow path flow along the common tangent toward the center flow path curved likewise. Thus, the grass clippings flow smoothly without being unnecessarily decelerated. Further, the grass clippings having flowed through the curved center flow path and first side flow path flow along the common tangent into the discharge flow path lying ahead, without being unnecessarily decelerated. This construction contributes to smoother flows to the discharge flow path of the grass clippings cut by the respective blades.

In the case of a mid-mount lawn tractor having the above rear discharge mower unit according to this invention suspended between front wheels and rear wheels, the grass clippings outlet may have a discharge opening directed to a position between the rear wheels. Then, the grass clippings may be heaped between the ruts of the rear wheels without being crushed under the wheels, thereby to facilitate a subsequent grass collecting operation.

The secondary object of this invention is fulfilled by a lawn tractor having the foregoing rear discharge mower unit suspended between front wheels and rear wheels, a grass catcher disposed rearwardly of the rear wheels, and a grass clippings transport duct having one end connected to the grass clippings outlet, extending between the rear wheels, and having the other end connected to the grass catcher.

In this construction, grass clippings cut by the respective blades and collected in the grass clippings outlet after flowing through the respective flow paths are transported through the grass clippings transport duct to the grass catcher to accumulate therein. Since each flow path is defined by its own baffle, there occurs no loss of air flow, whereby the grass clippings pass through the grass clippings transport duct with sufficient momentum.

A connection between the grass catcher and the grass clippings transport duct is usually located at a higher level than the bottom of the grass catcher. In a preferred embodiment of this invention, the rear wheels have axles downwardly offset in an intermediate portion, and the grass clippings transport duct extends obliquely upward over an offset axle portion. Thus, the grass clippings transport duct extends with a relatively gentle inclination to be connected to a desired connecting position of the grass catcher.

Further, a lawn tractor in a preferred embodiment of this invention may have an engine disposed in a forward position of a tractor body and a propelling transmission disposed in a rearward position of the tractor body. The engine and transmission are interconnected by a transmission shaft extending at one side of a longitudinal axis of the tractor body, while the grass clippings transport duct extends at the other side of the longitudinal axis. With this construction, a limited space under the tractor body is allocated to the transmission shaft and the grass clippings transport duct. This realizes a mid-mount lawn tractor equipped with a grass catcher, which has a compact construction with reduced dead space.

Other features and advantages of this invention will be apparent from the following description of an embodiment of the invention taken with reference to the drawings.

DESCRIPTION OF THE PREFERRED EMBODIMENT

Figure 1:
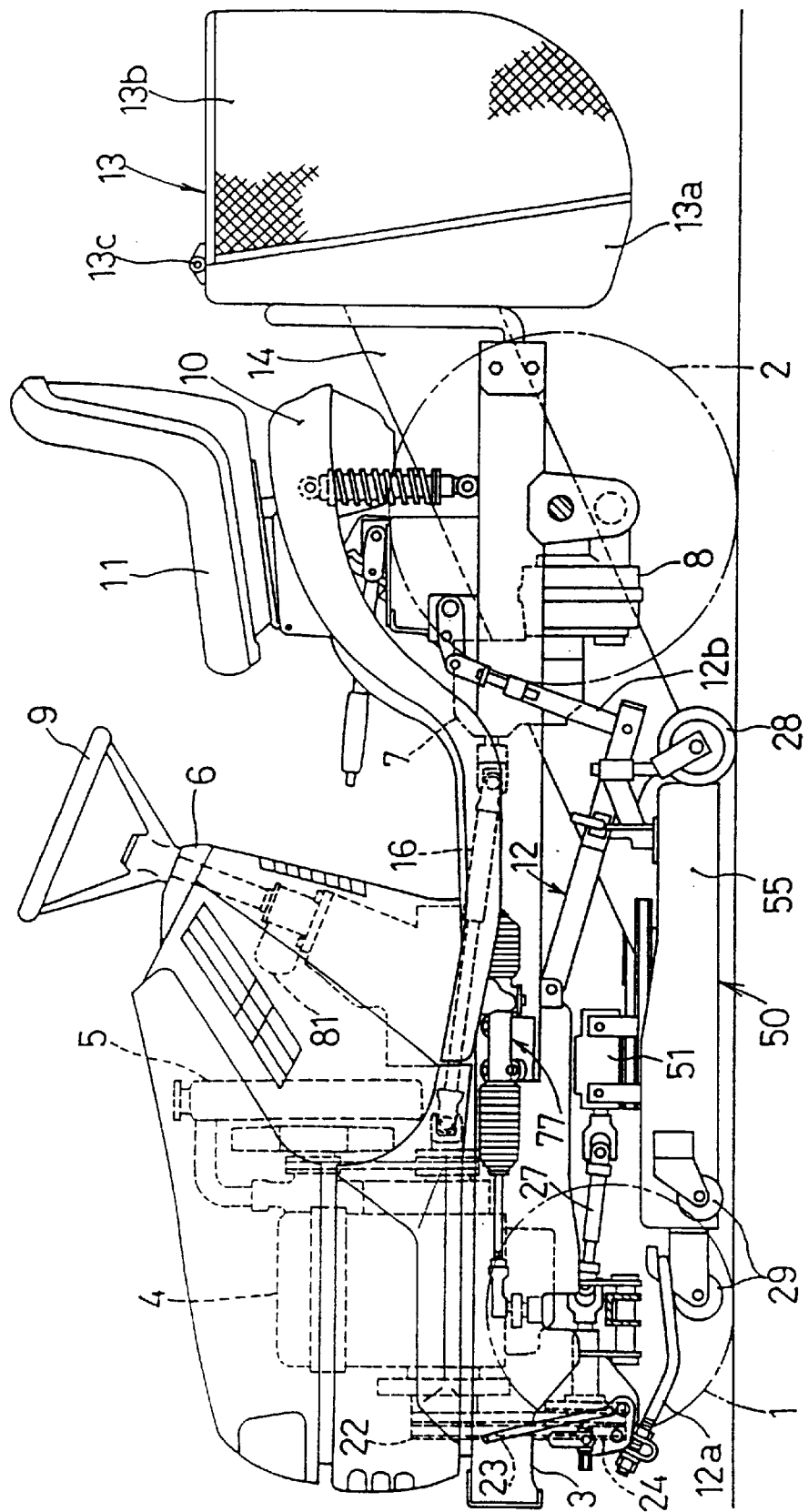
FIG. 1 is a side elevation of a riding lawn tractor.

FIG. 1 shows a riding lawn tractor having a pair of right and left front wheels 1 acting as dirigible wheels, and a pair of right and left rear wheels 2 acting as drive wheels. The wheels 1 and 2 support body frames 3 formed of sheet metal and having a motor section having an engine 4 and a radiator 5 mounted on a forward portion thereof. The body frames 3 further support a steering column 6 disposed in an intermediate position thereof. An HST 7 and a gear type transmission 8 are installed on a rear portion of the body frames 3. A steering wheel 9 is attached to an upper end of the steering column 6. A rear wheel fender 10 extends to the steering column 6 to form a control section, with a driver's seat 11 disposed above the rear wheel fender 10. A mower unit 50 is vertically movably suspended from the body frames 3 between front wheels 1 and rear wheels 2 through a link mechanism 12.

A grass catcher 13 is connected to the rear ends of body frames 3 and rear wheel fender 10. Grass clippings cut by the mower unit 50 are transported through a grass clippings transport duct 14 to the grass catcher 13 to be collected therein. The grass catcher 13 includes a stationary portion 13a fixed to the body frames 3 and rear wheel fender 10, and a pivotable portion 13b pivotable about a pivotal axis 13c disposed on top of the stationary portion 13a. The pivotable portion 13b is pivotable to open a lower area of the grass catcher 13 for allowing discharge of grass clippings to a suitable location. The stationary portion 13a includes a connection to the grass clippings transport duct 14 defining an opening having a vertical space for accommodating movements of the transport duct 14 resulting from vertical movements of the mower unit 50.

Figure 2:
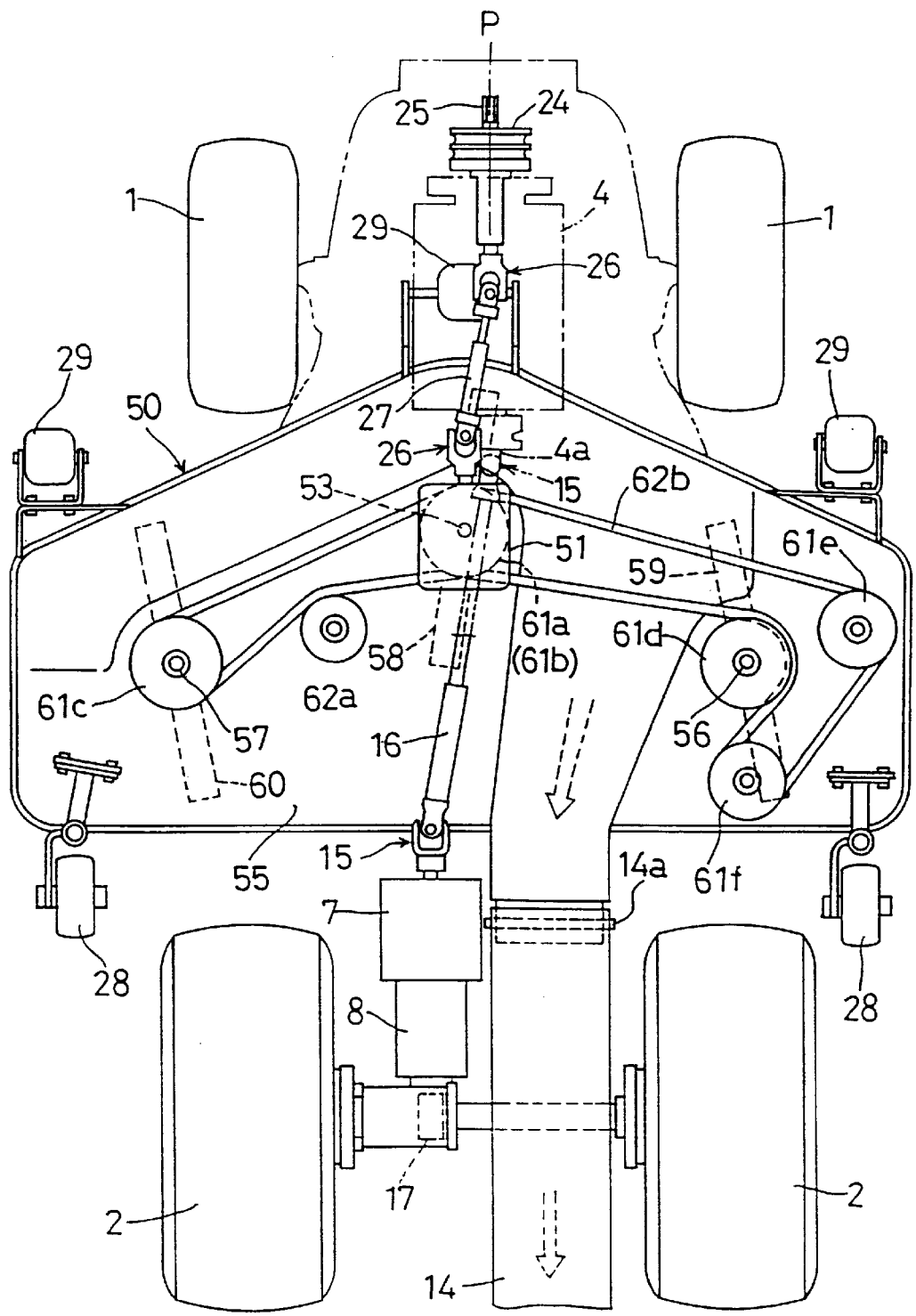
FIG. 2 is a plan view of the lawn tractor showing propelling drive and mower drive transmission lines.
Figure 3:
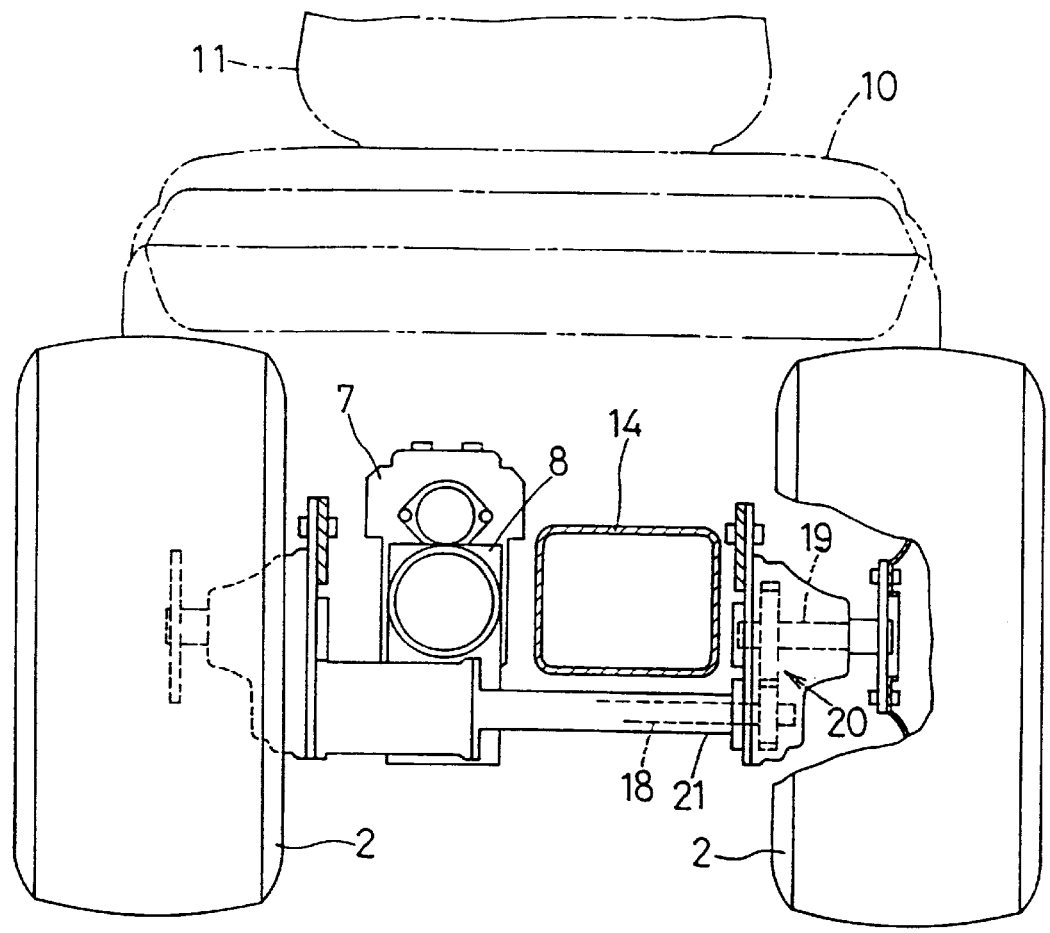
FIG. 3 is a rear view of the lawn tractor showing a relationship between rear axles and a grass clippings transport duct.

A propelling transmission line for transmitting power of the engine 4 to the rear wheels 2 will be described next. As shown in FIGS. 1 and 2, the engine 4 has an output shaft 4a extending along a longitudinal axis P of the tractor body. The engine output shaft 4a is connected at a rear end thereof, through a universal joint 15, to one end of an intermediate transmission shaft 16. The other end of intermediate transmission shaft 16 is connected to an input shaft of HST 7 through a universal joint 15. HST 7 has an output shaft connected to an input shaft of the gear type transmission 8. The power outputted in varied speeds from HST 7 is transmitted in a higher or lower speed to a differential 17. The engine power is distributed by the differential 17 to the right and left rear wheels 2. The two power transmission lines are substantially the same, and only the line to the right rear wheel 2 will be described here with reference to FIG. 3. The power outputted from the differential 17 is transmitted to an intermediate axle 18 extending transversely of the longitudinal axis P of the tractor body. The intermediate axle 18 has an axial level lower than that of an axle 19 of the rear wheel 2. The level difference is filled by a gear transmission mechanism 20 disposed between the intermediate axle 18 and axle 19. The differential 17, intermediate axle 18 and gear transmission mechanism 20 are contained in a casing having an inverted gate shape and suspended from the body frames 3.

The HST 7 is a hydrostatic stepless transmission having a variable displacement hydraulic pump, and a hydraulic motor driven by oil from this hydraulic pump. This transmission is switchable between forward drive and backward drive across a neutral position for no drive transmission, and is capable of stepless change speed for both forward drive and backward drive. By switching HST 7 to the forward drive and making a change speed operation, the rear wheels 2 are driven forward at varied speeds. By switching HST 7 to the backward drive and making a change speed operation, the rear wheels 2 are driven backward at varied speeds. The rear wheels 2 are stopped by operating HST 7 to neutral.

Since the intermediate axle 18 is at a low level above the ground, a relatively large space is provided between the casing portion enclosing the intermediate axle 18 and the lower surface of the tractor body. The grass clippings transport duct 14 extends rearward and upward through this space. As seen from FIG. 3, the propelling transmission line including the intermediate transmission shaft 16, HST 7 and gear type transmissions 8, and the grass clippings transport duct 14, extend along the longitudinal axis P of the tractor body, as distributed left and right across the longitudinal axis P. Particularly, this arrangement makes good use of the space under the tractor body adjacent the rear wheels 2.

Figure 4:
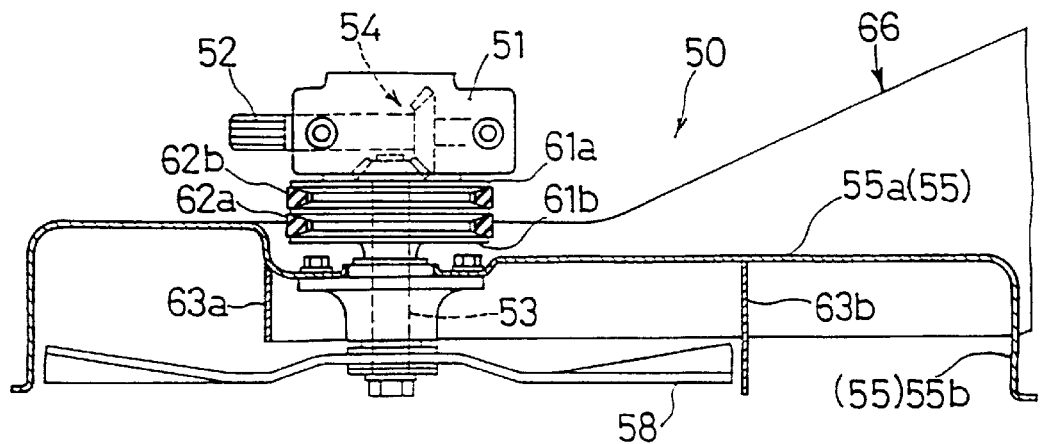
FIG. 4 is a sectional view showing the mower drive transmission line for driving a mower unit.

A mower drive transmission mechanism for transmitting the power of engine 4 to the mower unit 50 will be described next. As shown in FIGS. 1, 2 and 4, a double drive pulley 22 is mounted on a forward end of engine output shaft 4a. The drive pulley 22 drives, through a V-belt 23, and rotates a driven pulley 24 mounted on a first intermediate transmission shaft 25. The first intermediate transmission shaft 25 is rotatably supported by a bearing block 26 suspended from the body frames 3. The first intermediate transmission shaft 25 has a rear end thereof connected to one end of a second intermediate transmission shaft 27 through a universal joint 26. The other end of the second intermediate transmission shaft 27 is connected through a universal joint 26 to an input shaft 52 provided for an input box 51 of mower unit 50. This universal joint 26 permits the mower unit 50 to be moved vertically within a predetermined range through a pair of front and rear pivot links 12a and 12b constituting the link mechanism 12. The input box 51 further supports a center blade shaft 53 extending vertically. The input shaft 52 and center blade shaft 53 are in drivable connection through a bevel gear mechanism 54.

A mower housing 55 includes a ceiling 55a and a peripheral wall 55 depending from the ceiling 55a, with the input box 51 mounted on the ceiling 55a. The ceiling 55a rotatably supports a first side blade shaft 56 and a second side blade shaft 57 extending vertically and arranged at opposite sides spaced from the center blade shaft 53. The first side blade shaft 56 and second side blade shaft 57 are slightly staggered rearward from the central blade shaft 53. The center blade shaft 53 has a center blade 58 fixed to a lower end thereof. The first side blade shaft 56 has a first side blade 59 fixed to a lower end thereof. The second side blade shaft 57 has a second side blade 60 fixed to a lower end thereof. These blades have tip ends thereof describing loci of revolution slightly overlapping one another to leave no uncut grass therebetween.

A first and a second pulleys 61a and 61b are attached to upper positions of center blade shaft 53, a third pulley 61c to the second side blade shaft 57, and a fourth pulley 61d to the first side blade shaft 56. Further, a fifth and a sixth, direction changing pulleys 61e and 61f are arranged adjacent the first side blade shaft 56.

A first belt 62a is wound around the second pulley 61b and third pulley 61c so that the two pulleys rotate in the same direction. A second belt 62b is wound around the first pulley 61a and fourth pulley 61d such that opposite surfaces of the second belt engage the two pulleys through use of the fifth and sixth, direction changing pulleys 61e and 61f. As a result, the first pulley 61a and fourth pulley 61d rotate in opposite directions. That is, the center blade 58 and second side blade 60 rotate clockwise while the first side blade 59 rotates counterclockwise.

The lawn tractor runs while rotating the three blades 58, 59 and 60 through the above mower drive transmission mechanism. Gauge wheels 28 are attached to right and left sides at the rear of the mower housing 55 to be rotatable about axes extending transversely of the tractor body. These gauge wheels 28 roll on a turf ground as the tractor travels, whereby the grass is cut at a desired cutting height determined by a height of attachment to the mower housing 55 of the gauge wheels 28. The mower housing 55 includes three antiscalp rollers 29 arranged transversely of a forward end thereof to be rotatable about transverse axes. Consequently, the mower unit 50 can ride over any obstacles such as ridges on the ground.

Figure 5:
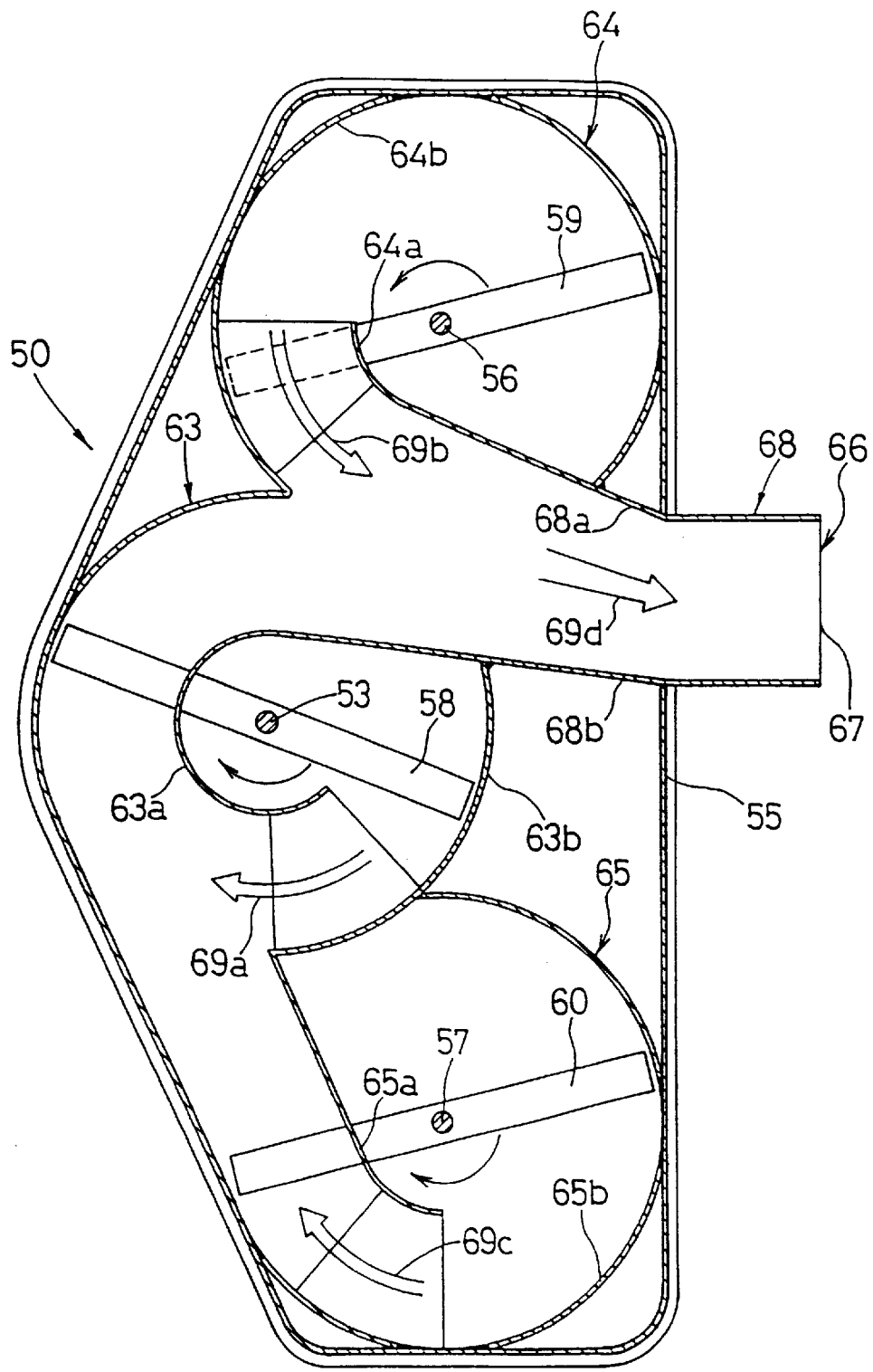
FIG. 5 is a schematic plan view showing baffles.

As shown in FIG. 5, the mower unit 50 includes a center baffle 63 disposed in a region of rotating locus of the center blade 58, a first side baffle 64 disposed in a region of rotating locus of the first side blade 59, and a second side baffle 65 disposed in a region of rotating locus of the second side blade 60. These baffles are provided in order to deliver grass clippings smoothly to a grass clippings outlet 66 disposed in the rear of the mower unit 50. Each baffle is in the form of baffle plates depending from the ceiling of mower housing 55. The center baffle 63 includes an arcuate inner baffle plate 63a having a smaller diameter than the center blade 58 and extending around the center blade shaft 53, and two arcuate outer baffle plates 63b having a larger diameter than the center blade 58. The first side baffle 64 includes an arcuate inner baffle plate 64a having a smaller diameter than the first side blade 59 and extending around the first side blade shaft 56, and an arcuate outer baffle plate 64b having a larger diameter than the first side blade 59. The second side baffle 65 includes an arcuate inner baffle plate 65a having a smaller diameter than the second side blade 60 and extending around the second side blade shaft 57, and an arcuate outer baffle plate 65b having a larger diameter than the second side blade 60. Further, the grass clippings outlet 66 is formed as a discharge baffle 68 including a first baffle plate 68a and a second baffle plate 68b. A rearwardly extending portion of the ceiling wall 55a, first baffle plate 68a and second baffle plate 68b define a discharge opening 67 at the rear ends thereof. In this embodiment, the second baffle plate 68b and first baffle plate 68a extend obliquely, such that the discharge opening 67 is disposed adjacent a transversely middle position of the mower unit 50.

The inner baffle plate 63a and outer baffle plate 63b of the center baffle 63 are connected to the second baffle plate 68b of the discharge baffle 68 to define a curved center flow path 69a extending in the direction of rotation of the center blade 58. Similarly, the inner baffle plate 64a and outer baffle plate 64b of the first side baffle 64 are connected to the first baffle plate 68a of the discharge baffle 68 to define a first side flow path 69b extending in the direction of rotation of the first side blade 59, i.e. winding in the opposite direction to the center flow path 69a. The center flow path 69a and first side flow path 69b join in a position downstream with respect to a grass clippings flowing direction, and communicate with a discharge flow path 69d defined by the first baffle plate 68a and the second baffle plate 68b of the discharge baffle 68. A region where the center flow path 69a and first side flow path 69b join is laid out to extend along a common tangent to circles of revolving loci of the tip ends of the center blade 58 and first side blade 59.

The inner baffle plate 65a and outer baffle plate 65b of the second side baffle 65 are connected to a rear position of the outer baffle plate 63b of the center baffle 63 to define a curved second side flow path 69c extending in the direction of rotation of the second side blade 60. The second side flow path 69c joins the center flow path 69a in a position downstream with respect to the grass clippings flowing direction. A region where the center flow path 69a and second side flow path 69c join is laid out to extend along a common tangent to circles of revolving loci of the tip ends of the center blade 58 and second side blade 60. The inner baffle plate 65a and outer baffle plate 65b include linear portions.

With the above layout of the center flow path 69a, first side flow path 69b, second side flow path 69c and discharge flow path 69d, grass clippings cut by the respective blades are carried smoothly to the common discharge opening 67 by air flows generated by the blades. The grass clippings are then delivered to the grass catcher 13 through the grass clippings transport duct 14. The upper boundaries of the respective flow paths are defined by the ceiling 55a of the mower housing 55. The grass clippings transported increase in quantity progressively in the downstream directions of the flow paths. Since it is necessary to increase the sectional passage areas, corresponding portions of the ceiling 55a of mower housing 55 are bulged to a larger extent in the downstream direction. Thus, the portion of the ceiling corresponding to the discharge flow path 69d is the highest. As shown in FIG. 2, the grass clippings outlet 66 and grass clippings transport duct 14 are oscillatably interconnected through a pivot pin 14a to permit vertical movement of the mower unit 50.

Next, a steering transmission line for transmitting turning of the steering wheel 9 to the front wheels 1 will be described. A power steering device 80 is incorporated into this steering transmission line.

Figure 6:
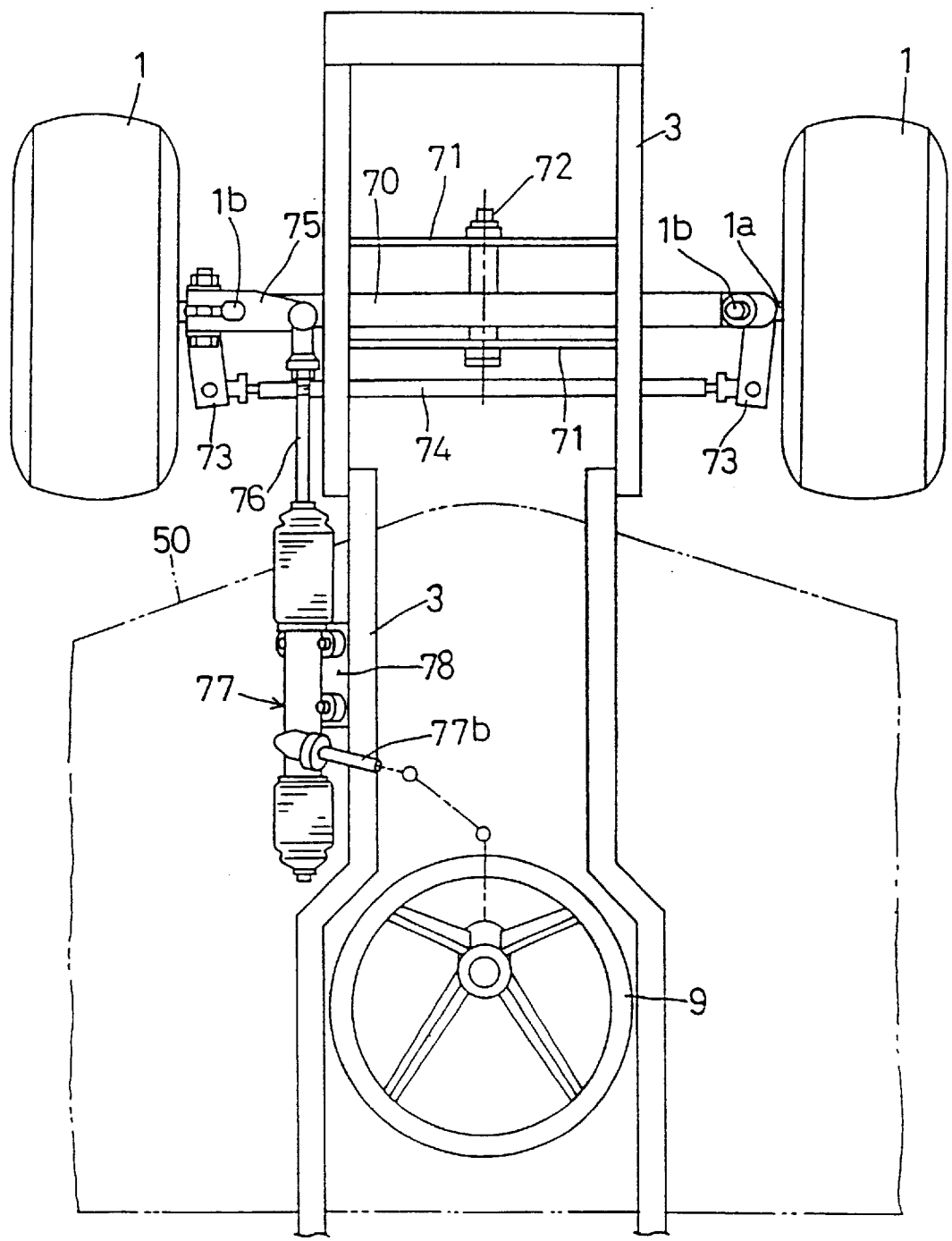
FIG. 6 is a plan view showing a steering displacement transmission line.
Figure 7:
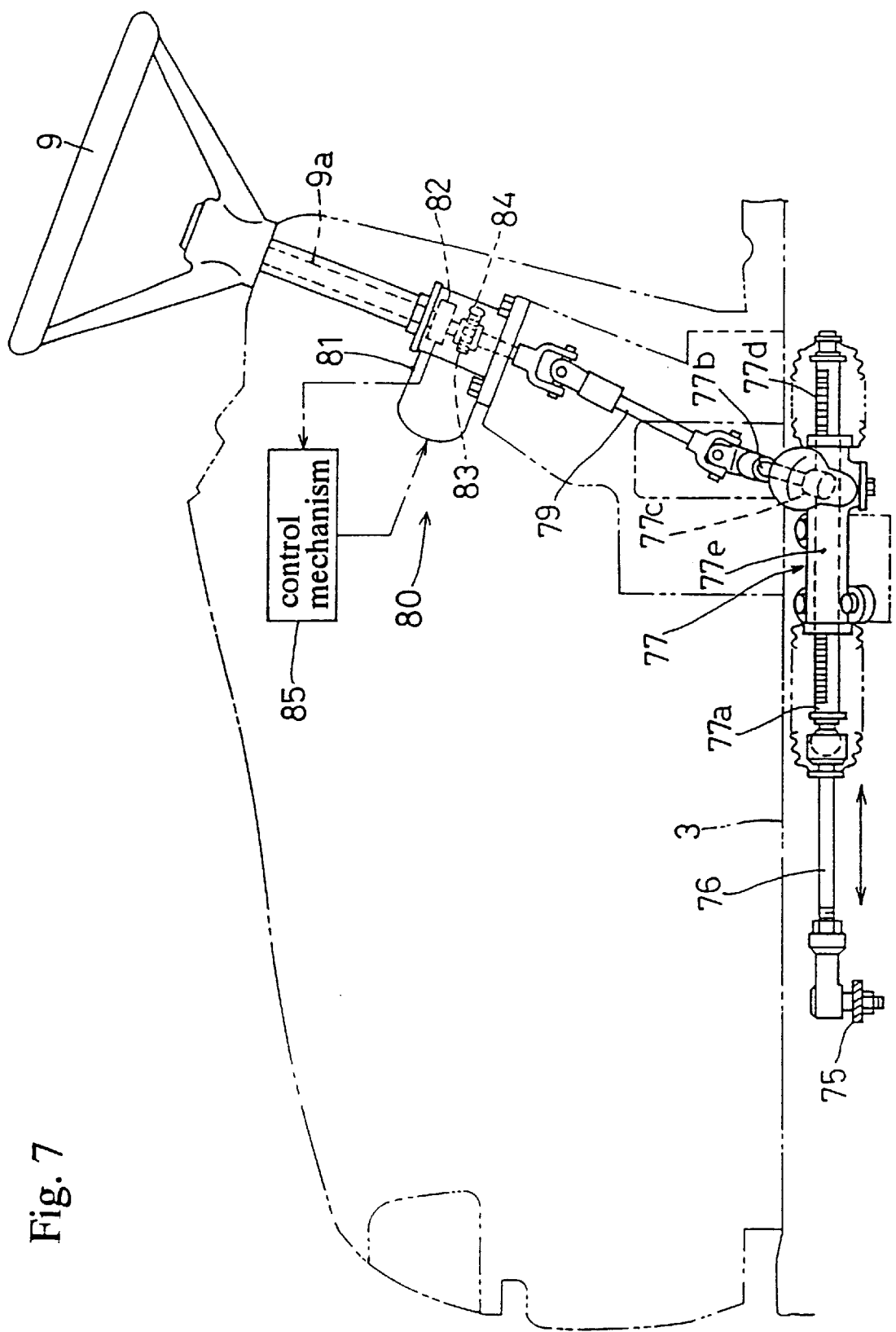
FIG. 7 is a side view showing the steering displacement transmission line.

As shown in FIG. 6, the left front wheel 1 is rotatably supported by an axle 1a, and a knuckle shaft 1b extends vertically from an end of the axle 1a to be rotatably supported in one end region of a front wheel support frame 70. The right front wheel 1 is rotatably supported by an axle 1a, and a knuckle shaft 1b extends vertically from an end of this axle 1a to be rotatably supported in the other end region of the front wheel support frame 70. The front wheel support frame 70 is pivotably supported in an intermediate position thereof by the body frames 3 through a pivot shaft 72 extending longitudinally of the tractor body between a pair of forward and rearward brackets 71 extending between forward end portions of the right and left body frames 3. A first knuckle arm 73 is connected to a lower end of the knuckle shaft 1b of left front wheel 1 to be pivotable with rotation of the knuckle shaft 1b. Further, a first knuckle arm 73 is connected to a lower end of the knuckle shaft 1b of right front wheel 1 to be pivotable with rotation of the knuckle shaft 1b. The two first knuckle arms 73 are interlocked through a tie rod 74 to be pivotable in the same direction. A second knuckle arm 75 is connected to an upper end of the knuckle shaft 1b of left front wheel 1 to be pivotable with rotation of the knuckle shaft 1b. The second knuckle arm 75 is connected through a drag link 76 to an output shaft 77a of a gear mechanism 77 mounted laterally of the left body frame 3 through a bracket 78. As shown in FIG. 7, the gear mechanism 77 has an input shaft 77b extending obliquely upward and inwardly of the tractor body. The input shaft 77b is connected through a rotary shaft 79 to a lower end of a rotary support shaft 9a of the steering wheel 9. The rotary support shaft 9a has, attached thereto, the power steering device 80 including an electric motor 81 to reduce the effort for turning the steering wheel 9.

That is, when the steering wheel 9 is turned, the rotary support shaft 9a rotates with the steering wheel 9 and its rotation is transmitted to the input shaft 77b of gear mechanism 77 through the rotary shaft 79. The gear mechanism 77 includes a pinion 77c rotatable with the input shaft 77b, and a rack 77d meshed with the pinion 77c and connected at one end thereof to the output shaft 77a, the pinion 77c and rack 77d being mounted in a gear case 77e. Consequently, the pinion 77c and rack 77d convert the torque of input shaft 77b into a linear displacement longitudinally of the tractor body. This linear displacement is transmitted from the output shaft 77a to the drag link 76. The drag link 76 driven back and forth causes the second knuckle arm 75 to pivot about a vertical axis of knuckle shaft 1b. As a result, the knuckle shaft 1b of left front wheel 1 rotates relative to the front wheel support frame 70, and its torque is transmitted from the first knuckle arm 73 of the left front wheel 1 to the first knuckle arm 73 of the right front wheel 1 through the tie rod 74. The knuckle shaft 1b of the right front wheel 1 thereby rotates in the opposite direction to the knuckle shaft 1b of the left front wheel 1 relative to the front wheel support frame 70. Consequently, the right and left front wheels 1 are steered in a direction corresponding to a turning direction of the steering wheel 4 by a steering angle corresponding to a turning angle of the steering wheel 4.

The power steering device 80 includes a sensor 82 and a support shaft drive gear 83 attached to the rotary support shaft 9a, an output gear 84 connected to the electric motor 81 and meshed with the support shaft drive gear 83, and a control mechanism 85 for interlocking the electric motor 81 to the sensor 82. When the steering wheel 9 is turned, the sensor 82 detects the direction of rotation and torque of the rotary support shaft 9a rotated by the steering wheel 9. In response to a signal from the sensor 82, the control mechanism 85 automatically drives the motor 81 in the direction corresponding to the rotation of rotary support shaft 9a. The motor 81 drives the support shaft drive gear 83 to apply a torque to the rotary support shaft 9a. As a result, the torque by the motor 81 of the rotary support shaft 9a is transmitted as an assisting force to the input shaft 77b of gear mechanism 77 through the rotary shaft 79. The gear mechanism 77 converts the torque of input shaft 77b into a linear force acting longitudinally of the tractor body and outputted from the output shaft 77a to the drag link 76 as noted hereinbefore. When turning of the steering wheel 9 is stopped, the rotation of the rotary support shaft 9a is stopped and this is detected by the sensor 82. Then, the control mechanism 85 automatically stops the motor 81 based on information from the sensor 82.

The power steering device 80 may be adapted to vary the assisting force according to a turning angle of the steering wheel 9. Then, a steering system may be provided such that, in time of straight running, the tractor does not easily meander since an increased effort is needed to turn the steering wheel 9, and the steering wheel 9 may be turned with less effort when the tractor makes a turn.

In the foregoing embodiment, the discharge opening 67 of mower unit 50 is connected to the grass clippings transport duct 14, and grass clippings are collected in the grass catcher 13. It is of course possible to remove the grass clippings transport duct 14 and grass catcher 13 to discharge grass clippings directly from the discharge opening 67. In this case also, since the discharge opening 67 opens between the right and left rear wheels, grass clippings are discharged and deposited substantially between the ruts of the rear wheels, thereby avoiding the inconvenience of the grass clippings scattering over a wide range.

Figure 8:
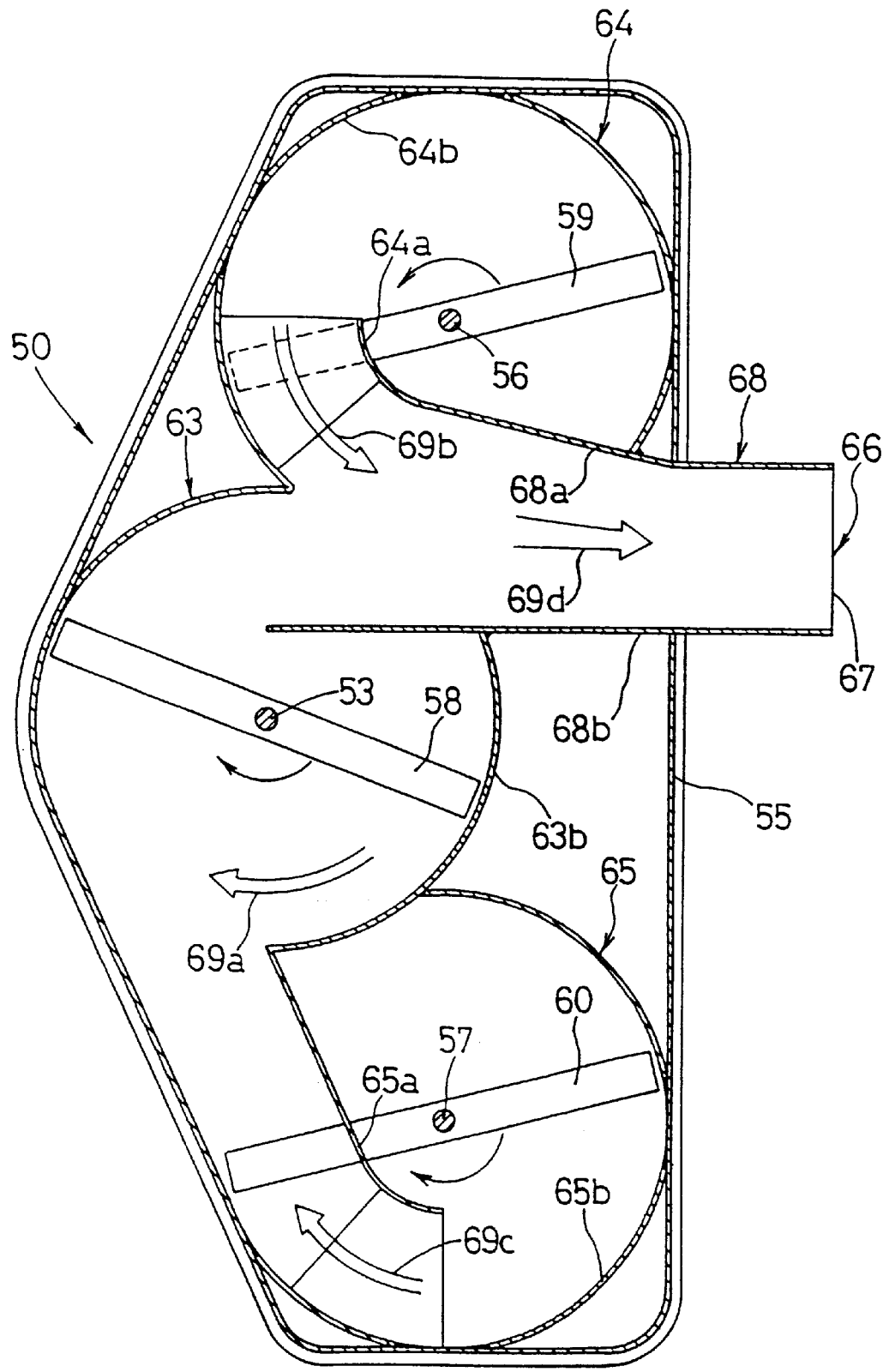
FIG. 8 is a schematic plan view showing a modified baffle.

FIG. 8 shows a mower unit 50 in another embodiment, in which the second baffle plate 68b extends linearly to offset the discharge opening 67 to the right from the center of mower unit 50. This construction provides an increased distance to the propelling transmission line located leftward from the center of mower unit 50. Further, the inner baffle plate of center baffle 63 is omitted here.

In the foregoing description, the baffles are in the form of guide plates depending from the ceiling 55a of mower housing 55. Other constructions may be employed within the scope of this invention. For example, the ceiling 55a may be pressed or otherwise formed into a three-dimensional shape to define baffles. Varied forms of baffles known in the art may be employed to form grass clippings flow paths.

What is claimed is:

1. A rear discharge mower unit comprising:
   a mower housing;
   a first side blade, a center blade and a second side blade arranged sideways in and rotatably supported by said mower housing, said first side blade, said center blade and said second side blade being positioned to cut grass on the ground;
   a power transmission mechanism for rotating said center blade and said second side blade in one direction and said first side blade in the other direction;
   a grass clippings outlet formed in a boundary region between said first side blade and said center blade;
   a center baffle extending around a rotational axis of said center blade and defining a center flow path for feeding grass clippings to said grass clippings outlet;
   a first side baffle extending around a rotational axis of said first side blade and defining a first side flow path for feeding grass clippings to said grass clippings outlet; and
   a second side baffle extending around a rotational axis of said second side blade and defining a second side flow path in communication with said center flow path in a forward position of said mower housing for feeding grass clippings to said center flow path.

2. A mower unit as defined in claim 1, wherein said grass clippings outlet includes a discharge baffle connected to said center baffle and said first side baffle, said discharge baffle defining a discharge flow path for collecting and discharging grass clippings cut by said first side blade, said center blade and said second side blade.

3. A mower unit as defined in claim 2, wherein said discharge baffle includes a first baffle plate disposed adjacent said first side blade side, and a second baffle plate disposed adjacent said center blade, said second baffle plate extending obliquely to locate a discharge opening of said discharge flow path adjacent a middle position of said mower housing.

4. A mower unit as defined in claim 2, wherein said discharge baffle includes a first baffle plate disposed adjacent said first side blade, and a second baffle plate disposed adjacent said center blade, said second baffle plate extending linearly to locate a discharge opening of said discharge flow path away from a middle position of said mower housing.

5. A mower unit as defined in claim 2, wherein said second side flow path joins said center flow path in a region extending along a common tangent to circles of loci of said center blade and said second side blade, and said center flow path and said first side flow path join in a region extending along a common tangent to circles of loci of said center blade and said first side blade and communicating with said discharge flow path.

6. A lawn tractor comprising a rear discharge mower unit suspended between front wheels and rear wheels, said rear discharge mower unit including:
   a mower housing, and a first side blade, a center blade and a second side blade arranged sideways in and rotatably supported by said mower housing, said first side blade, said center blade and said second side blade being positioned to cut grass on the ground;
   a power transmission mechanism for rotating said center blade and said second side blade in one direction and said first side blade in the other direction;
   a grass clippings outlet formed in a boundary region between said first side blade and said center blade, said grass clippings outlet having a discharge opening directed to a position between said rear wheels;
   a center baffle extending around a rotational axis of said center blade and defining a center flow path for feeding grass clippings to said grass clippings outlet;
   a first side baffle extending around a rotational axis of said first side blade and defining a first side flow path for feeding grass clippings to said grass clippings outlet; and
   a second side baffle extending around a rotational axis of said second side blade and defining a second side flow path in communication with said center flow path in a forward position of said mower housing for feeding grass clippings to said center flow path.

7. A lawn tractor having a grass catcher disposed rearwardly of rear wheels, comprising a rear discharge mower unit suspended between front wheels and the rear wheels, said rear discharge mower unit including:
   a mower housing;
   a first side blade, a center blade and a second side blade arranged sideways in and rotatably supported by said mower housing, said first side blade, said center blade and said second side blade being positioned to cut grass on the ground;
   a power transmission mechanism for rotating said center blade and said second side blade in one direction and said first side blade in the other direction;
   a grass clippings outlet formed in a boundary region between said first side blade and said center blade;
   a center baffle extending around a rotational axis of said center blade and defining a center flow path for feeding grass clippings to said grass clippings outlet;
   a first side baffle extending around a rotational axis of said first side blade and defining a first side flow path for feeding grass clippings to said grass clippings outlet;
   a second side baffle extending around a rotational axis of said second side blade and defining a second side flow path in communication with said center flow path in a forward position of said mower housing for feeding grass clippings to said center flow path; and
   a grass clippings transport duct having one end connected to said grass clippings outlet, extending between said rear wheels, and having the other end connected to a grass catcher.

8. A lawn tractor as defined in claim 7, wherein said rear wheels have axles downwardly offset in an intermediate portion, said grass clippings transport duct extending obliquely upward over the offset axle portion.

9. A lawn tractor as defined in claim 7, wherein an engine disposed in a forward position of a tractor body and a propelling transmission disposed in a rearward position of the tractor body are interconnected by a transmission shaft extending at one side of a longitudinal axis of the tractor body, while said grass clippings transport duct extends at the other side of the longitudinal axis.

10. A lawn tractor as defined in claim 7, further including an axle extending between said rear wheels, wherein said grass clippings transport duct extends over said axle extending between said rear wheels.

11. A lawn tractor as defined in claim 10, wherein a portion of said axle extending between said rear wheels is offset below a rotational axis of each said rear wheel.

12. A lawn tractor as defined in claim 7, wherein said second side flow path joins said center flow path in a region extending along a common tangent to circles of loci of said center blade and said second side blade.

13. A lawn tractor as defined in claim 12, wherein said center flow path and said first side flow path join in a region extending along a common tangent to circles of loci of said center blade and said first side blade.

14. A lawn tractor as defined in claim 7, wherein said grass clippings outlet includes a discharge baffle connected to said center baffle and to said first side baffle, said discharge baffle defining a discharge flow path for collecting and discharging combined grass clippings cut by said first side blade, said center blade and said second side blade.

15. A lawn tractor as defined in claim 6, wherein said second side flow path joins said center flow path in a region in a forward portion of said mower housing extending along a common tangent to circles of loci of said center blade and said second side blade.

16. A lawn tractor as defined in claim 15, wherein said center flow path and said first side flow path join in a region extending along a common tangent to circles of loci of said center blade and said first side blade.

17. A lawn tractor as defined in claim 6, wherein said grass clippings outlet includes a discharge baffle connected to said center baffle and to said first side baffle, said discharge baffle defining a discharge flow path for collecting and discharging combined grass clippings cut by said first side blade, said center blade and said second side blade.

18. A mower unit as defined in claim 1, wherein said second side baffle defines said second side flow path such that said second side flow path joins said center flow path in a forward region of said mower housing.

19. A mower unit as defined in claim 18, wherein said second side flow path extends generally along a common tangent to circles of loci of said center blade and said second side blade.

20. A mower unit as defined in claim 1, wherein said second side flow path extends along a front vertical wall of said mower housing in a plan view.

21. A mower unit as defined in claim 1 wherein said first side blade, said center blade and said second side blade are positioned at the same height relative to the ground.

* * * * *